(12) United States Patent
Kato

(10) Patent No.: US 7,643,083 B2
(45) Date of Patent: Jan. 5, 2010

(54) IMAGING APPARATUS AND EMISSION CONTROL METHOD FOR USE IN IMAGING APPARATUS

(75) Inventor: Yoshiyuki Kato, Higashiyamato (JP)

(73) Assignee: Casio Computer Co., Ltd., Tokyo (JP)

( * ) Notice: Subject to any disclaimer, the term of this patent is extended or adjusted under 35 U.S.C. 154(b) by 643 days.

(21) Appl. No.: 11/068,689

(22) Filed: Feb. 28, 2005

(65) Prior Publication Data

US 2005/0195312 A1 Sep. 8, 2005

(30) Foreign Application Priority Data

Mar. 2, 2004 (JP) .............................. 2004-057999

(51) Int. Cl.
*H04N 5/235* (2006.01)

(52) U.S. Cl. ..................................... 348/362

(58) Field of Classification Search ................ 348/362, 348/371, 370
See application file for complete search history.

(56) References Cited

U.S. PATENT DOCUMENTS

| | | | |
|---|---|---|---|
| 4,549,801 A * | 10/1985 | Winter ........................ 396/106 |
| 4,962,521 A * | 10/1990 | Komatsu et al. .......... 348/14.14 |
| 5,218,397 A * | 6/1993 | Takagi ......................... 396/157 |
| 5,438,367 A * | 8/1995 | Yamamoto et al. .......... 348/371 |
| 5,630,036 A * | 5/1997 | Sonohara et al. ............. 345/589 |
| 5,950,023 A * | 9/1999 | Hara et al. .................... 396/158 |
| 6,700,619 B1 * | 3/2004 | Hamamura ................. 348/370 |
| 6,744,471 B1 * | 6/2004 | Kakinuma et al. ........... 348/371 |
| 6,885,405 B1 * | 4/2005 | Steinberg et al. ............. 348/371 |
| 7,046,290 B2 * | 5/2006 | Nozaki ........................ 348/350 |
| 7,180,541 B2 * | 2/2007 | Kinjo ........................... 348/239 |
| 7,253,836 B1 * | 8/2007 | Suzuki et al. ................ 348/234 |
| 2004/0008274 A1 * | 1/2004 | Ikari et al. ................... 348/370 |
| 2004/0075762 A1 * | 4/2004 | Okubo ........................ 348/371 |
| 2004/0105007 A1 * | 6/2004 | Takagi et al. ............. 348/207.1 |
| 2004/0135923 A1 * | 7/2004 | Kato ........................... 348/371 |
| 2004/0201719 A1 * | 10/2004 | Martins et al. ........... 348/222.1 |
| 2005/0195312 A1 * | 9/2005 | Kato ........................... 348/362 |

FOREIGN PATENT DOCUMENTS

| | | |
|---|---|---|
| JP | 60-032488 A | 2/1985 |
| JP | 02-294169 A | 12/1990 |
| JP | 08-163430 A | 6/1996 |
| JP | 2003-270697 A | 9/2003 |
| JP | 2003-319255 A | 11/2003 |

* cited by examiner

*Primary Examiner*—Tuan Ho
*Assistant Examiner*—Kent Wang
(74) *Attorney, Agent, or Firm*—Frishauf, Holtz, Goodman & Chick, P.C.

(57) ABSTRACT

The data of each pixel of a CCD, acquired from double pre-emissions performed in accordance with a shutter operation, is estimated to determine appropriate luminous energy for actual photography. Specifically, in each frame between the shutter operation and emission for actual photography, a CCD is driven so that only the data of the pixels corresponding to an estimation area is transferred, and the data of the other pixels is destroyed. The estimation area is included in the image pickup area of the CCD and used to determine the appropriate luminous energy. As a result, the time required to transfer pixel data unnecessary for estimation is omitted, thereby reducing the total processing time ranging from the pre-emissions to the emission for actual photography, and realizing prompt actual photography with appropriate luminous energy.

9 Claims, 10 Drawing Sheets

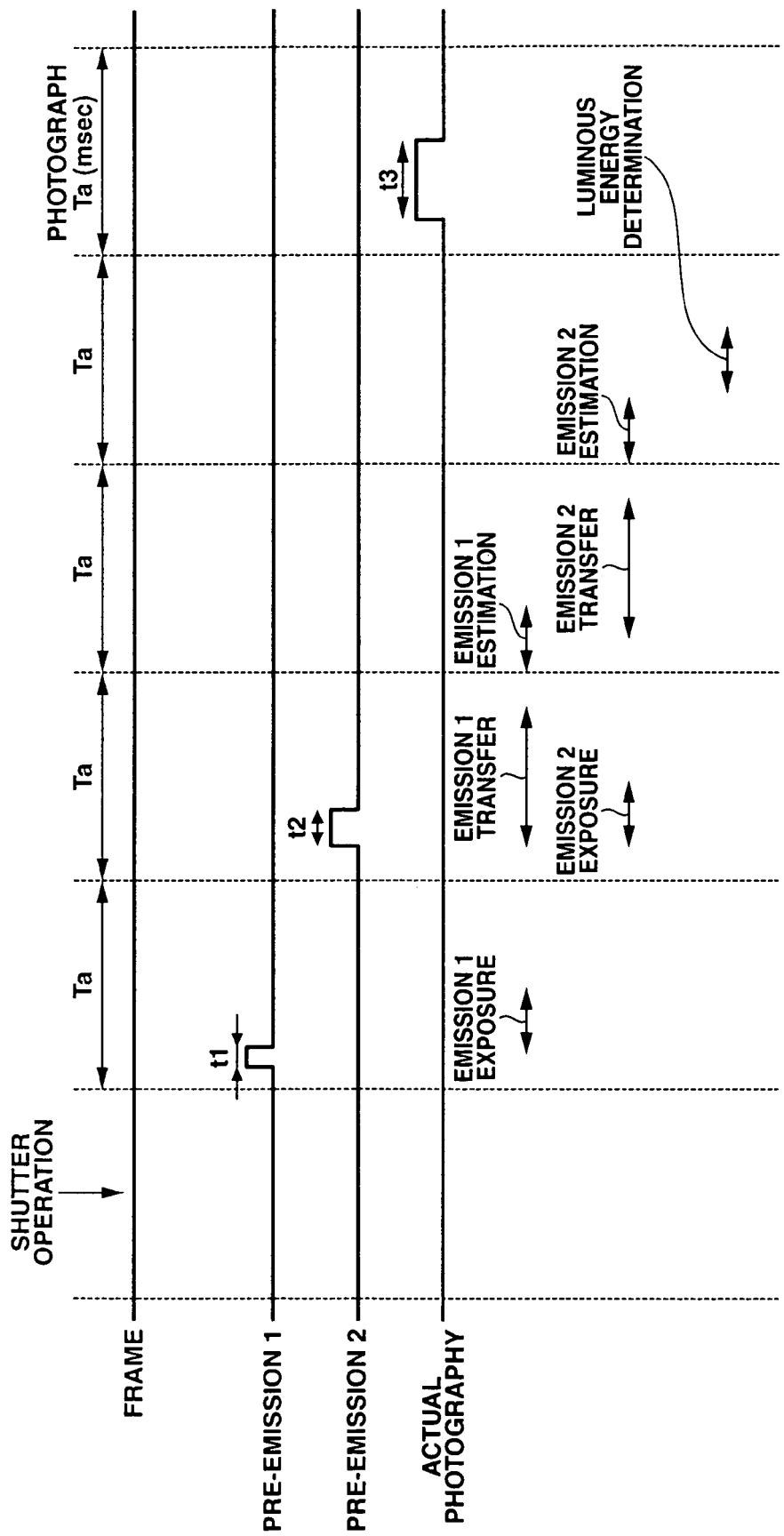

IMAGING APPARATUS AND EMISSION CONTROL METHOD FOR USE IN IMAGING APPARATUS

CROSS-REFERENCE TO RELATED APPLICATIONS

This application is based upon and claims the benefit of priority from prior Japanese Patent Application No. 2004-057999, filed Mar. 2, 2004, the entire contents of which are incorporated herein by reference.

BACKGROUND OF THE INVENTION

1. Field of the Invention

The present invention relates to an imaging apparatus, such as a digital camera, and more particularly to an imaging apparatus equipped with a strobe light, and a control method for controlling the luminous energy of the strobe light.

2. Description of the Related Art

Imaging apparatuses, such as digital cameras, are equipped with a strobe light. Strobe lights are designed to emit light in synchronism with the shutter to adjust the degree of exposure during photography, and are also called flashes.

There is a known method for controlling the luminous energy of a strobe light during photography. In this method, strobe light converges on a subject, the light reflected from the subject is received by a sensor, and when the integrated value of the reflected light reaches a preset value, the emission operation of the strobe light is stopped.

Further, to reduce the number of required components, size, etc., strobe lights widely employ a through-the-lens (TTL) pre-emission method. In this method, pre-emission using predetermined luminous energy is performed on a subject, thereby detecting the brightness of the subject using an image pickup element. Based on the detected brightness, the luminous energy for photography is determined.

The pre-emission method includes a method for determining the luminous energy for photography by one-time pre-emission operation, and a method for determining the same by repeating the pre-emission operation several times. Furthermore, the applicant, for example, has proposed a method for determining appropriate luminous energy from double pre-emission operations in which the luminous energy is varied (see Jpn. Pat. Appln. KOKAI Publication No. 2003-319255).

SUMMARY OF THE INVENTION

In accordance with a first aspect of the invention, an imaging apparatus is provided which includes:

an emission section configured to emit light to a subject;

an image pickup element including a plurality of pixels for forming an image of the subject;

a luminous energy controller which is configured to cause the emission section to perform two pre-emissions of the light at different luminous energy levels when a shutter operation is performed, and which is configured to estimate, for each of the two pre-emissions, data of each pixel in a luminous-energy estimation area in an image pickup area of the image pickup element, the data being acquired by exposure of the image pickup element to the pre-emission, to determine appropriate luminous energy for emission for actual photography; and an image-pickup-element driving section which is configured to drive the image pickup element during a period after the shutter operation and before the emission for actual photography to acquire only data of pixels corresponding to the estimation area in the image pickup area of the image pickup element, to then transfer the acquired data to the luminous energy controller, and to delete data of each of the pixels that do not correspond to the estimation area.

In accordance with a second aspect of the invention, an imaging apparatus is provided which includes:

an emission section configured to emit light to a subject;

an image pickup element including a plurality of pixels for forming an image of the subject;

a luminous energy controller which is configured to cause the emission section to perform two pre-emissions of the light at different luminous energy levels when a shutter operation is performed, and which is configured to estimate, for each of the two pre-emissions, data of each pixel in a luminous-energy estimation area in an image pickup area of the image pickup element, the data being acquired by exposure of the image pickup element to the pre-emission, to determine appropriate luminous energy of emission for actual photography; and an image-pickup-element driving section which is configured to drive the image pickup element during at least one estimation unnecessary period included in a period after the shutter operation and before the emission for actual photography to delete data of all of the pixels in the image pickup area of the image pickup element, and which is configured to drive the image pickup element during each period except for the at least one estimation unnecessary period during the period after the shutter operation and before the emission for actual photography to acquire only data of pixels corresponding to the estimation area in the image pickup area of the image pickup element, to then transfer the acquired data to the luminous energy controller, and to delete data of each of the pixels that do not correspond to the estimation area.

In accordance with a third aspect of the invention, an imaging apparatus is provided which includes:

emission means for emitting light to a subject;

an image pickup element including a plurality of pixels for forming an image of the subject;

luminous energy control means for causing the emission means to perform two pre-emissions of the light at different luminous energy levels when a shutter operation is performed, and for estimating, for each of the two pre-emissions, data of each pixel in a luminous-energy estimation area in an image pickup area of the image pickup element, the data being acquired by exposure of the image pickup element to the pre-emission, to determine appropriate luminous energy for emission for actual photography; and image-pickup-element driving means for driving the image pickup element during a period after the shutter operation and before the emission for actual photography to acquire only data of pixels corresponding to the estimation area in the image pickup area of the image pickup element, for then transferring the acquired data to the luminous energy control means, and for deleting data of each of the pixels that do not correspond to the estimation area.

In accordance with a fourth aspect of the invention, an imaging apparatus is provided which includes:

emission means for emitting light to a subject;

an image pickup element including a plurality of pixels for forming an image of the subject;

luminous energy control means for causing the emission means to perform two pre-emissions of the light at different luminous energy levels when a shutter operation is performed, and for estimating. for each of the two pre-emissions, data of each pixel in a luminous-energy estimation area in an image pickup area of the image pickup element, the data being acquired by exposure of the image pickup element to the pre-emission, to determine appropriate luminous energy for emission for actual photography; and image-pickup-element driving means for driving the image pickup element during at least one estimation unnecessary period included in a period after the shutter operation and before the emission for actual photography, to delete data of all of the pixels in the image pickup area of the image pickup element, and for driving the image pickup element during each period except for the at least one estimation unnecessary period during the period after the shutter operation and before the emission for actual photography to acquire only data of pixels corresponding to the estimation area in the image pickup area of the image pickup element, for then transferring the acquired data to the luminous energy means, and deleting data of each of the pixels that does not correspond to the estimated area.

In accordance with a fifth aspect of the invention, a luminous energy control method is provided for use in an imaging apparatus including an emission section configured to emit light to a subject, and an image pickup element including a plurality of pixels for forming an image of the subject. The method includes:

causing the emission section to perform two pre-emissions at different luminous energy levels in accordance with a shutter operation;

estimating, for each of the two pre-emissions, data of each pixel in a luminous-energy estimation area in an image pickup area of the image pickup element, the data being acquired by exposure of the image pickup element to the pre-emission, thereby determining appropriate luminous energy for emission for actual photography, and driving the image pickup element during a period after the shutter operation and before the emission for actual photography to acquire only data of pixels corresponding to the estimation area in the image pickup area of the image pickup element, then transferring the data to for use in determining the appropriate luminous energy, and deleting data of each of the pixels that does not correspond to the estimation area.

In accordance with a sixth aspect of the invention, a luminous energy control method is provided for use in an imaging apparatus including an emission section configured to emit light to a subject, and an image pickup element including a plurality of pixels for forming an image of the subject. The method includes:

causing the emission section to perform two pre-emissions at different luminous energy levels in accordance with a shutter operation;

estimating, for each of the two pre-emissions, data of each pixel in a luminous-energy estimation area in an image pickup area of the image pickup element, the data being acquired by exposure of the image pickup element to the pre-emission, thereby determining appropriate luminous energy for emission for actual photography;

driving the image pickup element during at least one estimation unnecessary period included in a period after the shutter operation and before the emission for actual photography to delete data of all of the pixels in the image pickup area of the image pickup element; and driving the image pickup element during each period except for the at least one estimation unnecessary period during the period after the shutter operation and before the emission for the actual photography to acquire only data of pixels corresponding to the estimation area in the image pickup area of the image pickup element, then transferring the data for use in determining the appropriate luminous energy, and deleting data of each of the pixels that does not correspond to the estimation area.

BRIEF DESCRIPTION OF THE SEVERAL VIEWS OF THE DRAWING

FIG. 15 is a timing chart useful in explaining the pre-emission operation of a conventional strobe light.

DETAILED DESCRIPTION OF THE INVENTION

Embodiments of the invention will be described in detail with reference to the accompanying drawings.

First Embodiment

Figure 1:
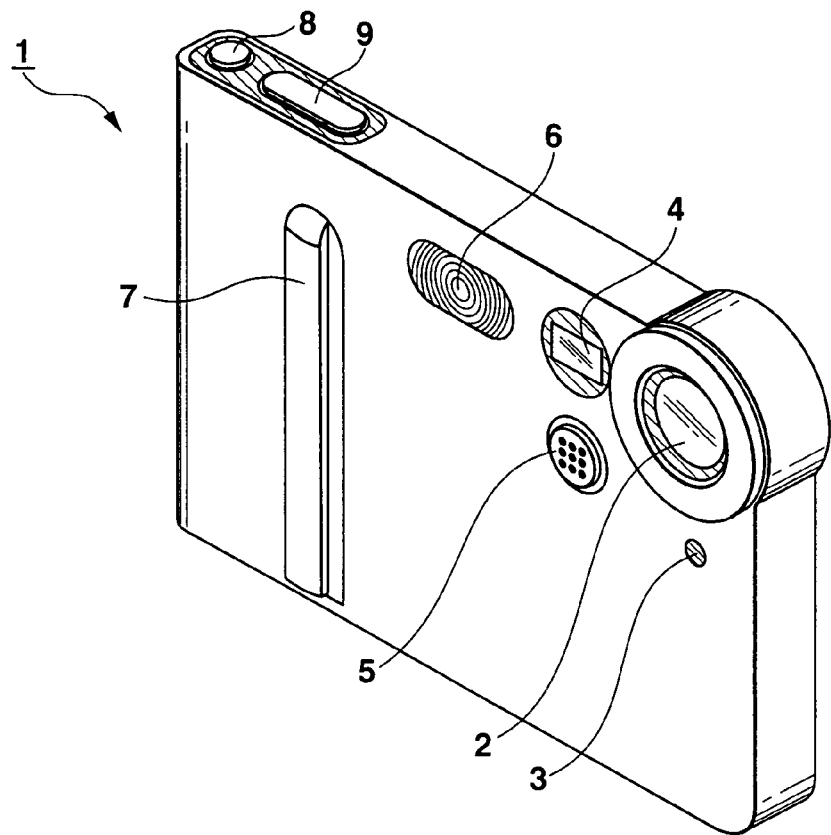
FIG. 1 is a perspective view illustrating the outward appearance (front side) of a digital camera as an example of an imaging apparatus according to a first embodiment of the invention.
Figure 2:
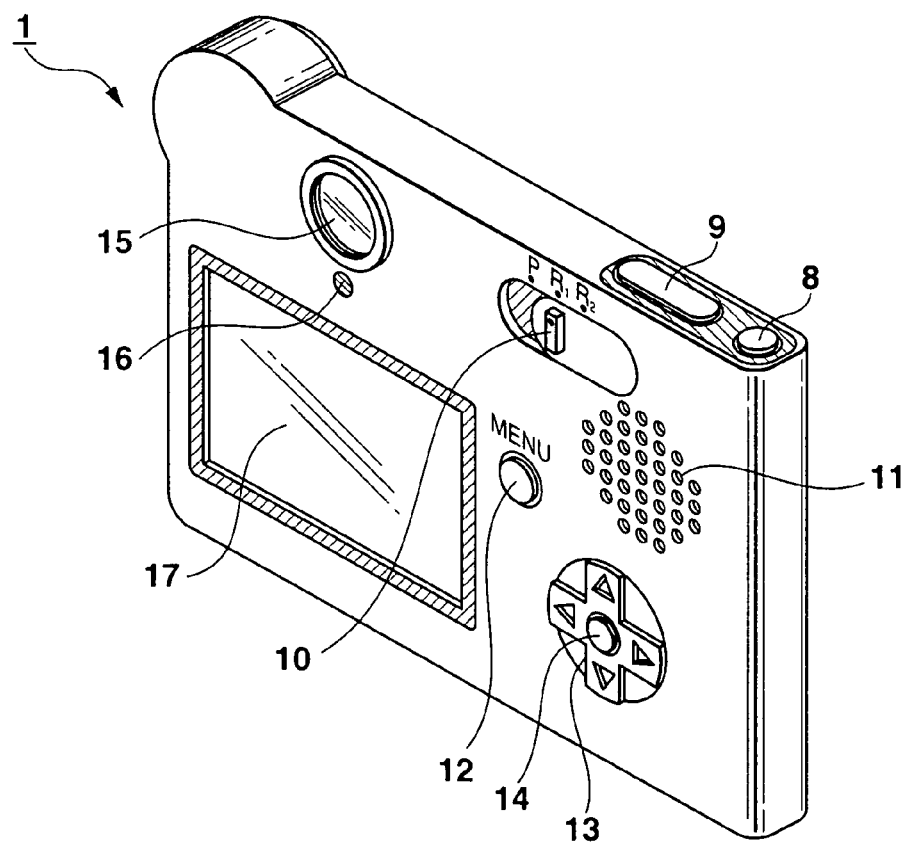
FIG. 2 is a perspective view illustrating the outward appearance (rear side) of the digital camera of FIG. 1.

FIGS. 1 and 2 show the outward appearance of a digital camera 1 as an example of an imaging apparatus according to a first embodiment of the invention. Specifically, FIG. 1 shows the front side of the digital camera 1, while FIG. 2 shows the rear side of the digital camera 1.

As shown, the digital camera 1 comprises a photography lens 2, self-timer lamp 3, optical finer window 4, microphone section 5, strobe emission section 6 and rubber grip 7, which are provided on the front surface of the rectangular thin camera casing. The digital camera 1 further comprises a power supply key 8 and shutter key 9 which are provided on the right portion (from the user side) of the upper surface of the camera casing.

The strobe emission section 6 is built in the camera casing as a flash device, and designed to emit light to a subject in accordance with the operation of the shutter key 9. The strobe emission section 6 is formed of a photography artificial light source that utilizes an electron flash emitted from, for example, a xenon discharge tube.

The rubber grip 7 is a linear projection of rubber provided on the right portion of the front surface of the casing of the digital camera 1, and enabling the middle, ring and little fingers of the right hand of a user to reliably grip the casing when the user photographs.

The power supply key 8 is provided for turning on and off the power supply. The shutter key 9 is provided for the user to designate photography timing.

On the rear surface of the digital camera 1, there are provided a mode switch (SW) 10, speaker section 11, menu key 12, cross key 13, set key 14, optical finder 15, strobe charger lamp 16 and display section 17.

The mode switch 10 is formed of, for example, a slide key switch, and is used to switch the basic mode between a record mode "R" and a playback mode "B". The record mode "R" includes a still-picture mode "R1" and a moving-picture mode "R2". The still-image mode "R1" is for photography of a still picture, and the moving-picture mode "R2" is for photography of a moving picture.

The shutter key 9 is commonly used in both modes "R1" and "R2". Specifically, in the still-picture mode "R1", a still image is photographed when the shutter key 9 is pushed. In the moving-picture mode "R2", photography of a moving picture is started when the shutter key 9 is pushed, and stopped when the shutter key 9 is again pushed.

The menu key 12 is operated to select one of, for example, various menu items. The cross key 13 is formed integrally of keys for moving the cursor upward, downward, leftward and rightward. These keys are used to move, for example, the displayed menu items. The set key 14 is located at the center of the cross key 13, and operated to set the content of, for example, the currently selected menu item.

The strobe charger lamp 16 is formed of an LED lamp located adjacent to the optical finder 15. This lamp visually informs the user of, for example, the charged state of the strobe emission section 6, regard-less of whether the user peeps through the optical finder 15 or looks at the display section 17.

The display section 17 is formed of a color liquid crystal panel with a backlight. This section is designed to serve, during photography, as an electronic finder for displaying a monitor or through image, and to display, during a playback operation, an image selected as a target to be played back.

On the bottom of the digital camera 1, there are provided, for example, a memory card slot (not shown) for attaching and detaching a memory card as a recording medium, and a serial interface connector (not shown), such as a universal serial bus (USB) connector, to be connected to, for example, an external personal computer.

Figure 3:
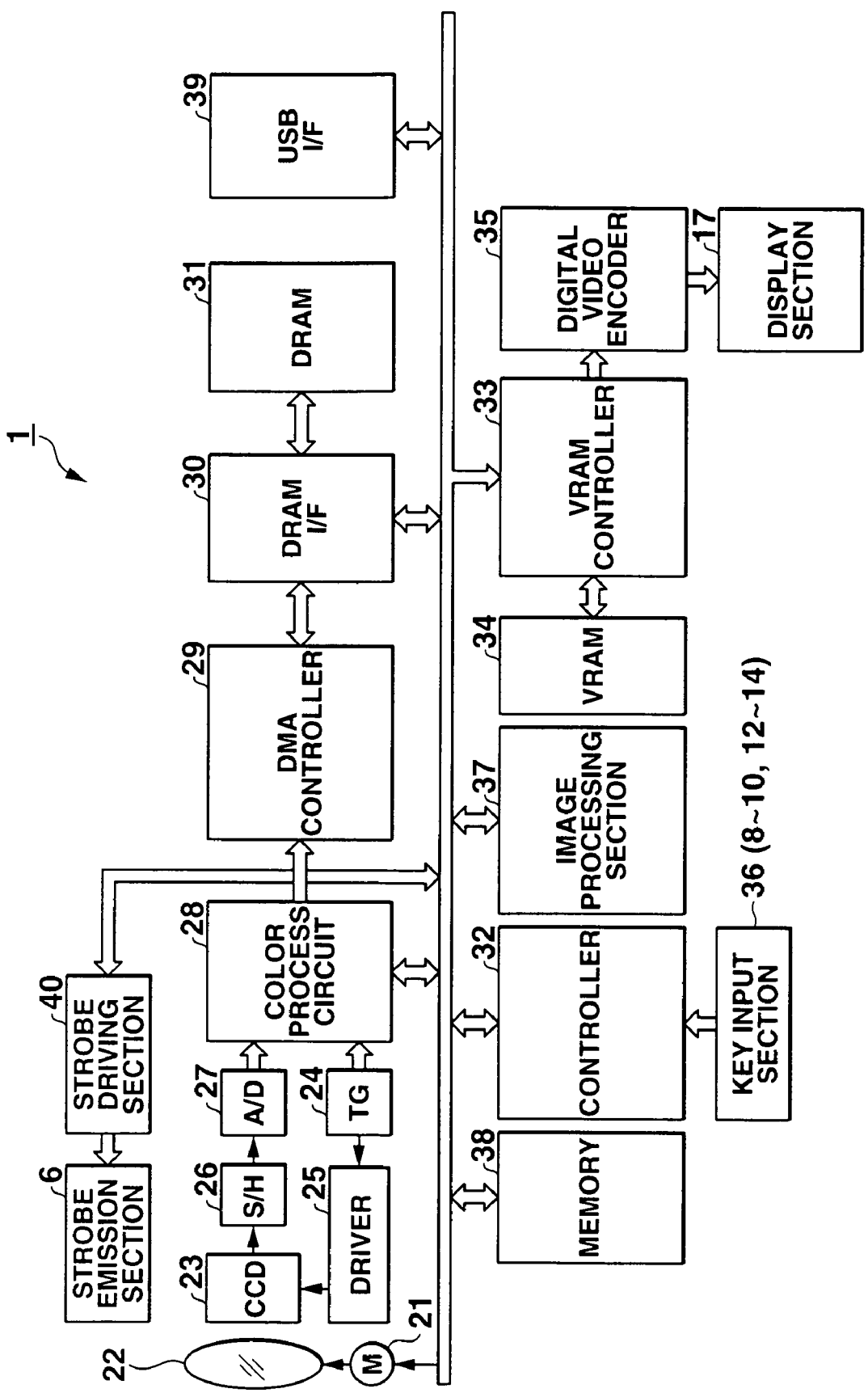
FIG. 3 is a block diagram illustrating an electronic circuit incorporated in the digital camera.

FIG. 3 is a block diagram illustrating an electronic circuit incorporated in the digital camera 1.

The digital camera 1 is also provided with a lens optical system 22 that realizes the photography lens 2. The lens optical system 22 is driven by a motor 21 so that it is movable along the optical axis within a predetermined range. A charged coupled device (CCD) 23 as an image pickup element is provided rearward of the lens optical system 22 with respect to the optical axis. The CCD 23 receives light passing through the photography lens 2 and outputs image data corresponding to the luminous energy received.

In the record mode as a basic mode, the CCD 23 is driven by a timing generator (TG) 24 and driver 25, thereby outputting, in units of frames, a photoelectric conversion output corresponding to an optical image formed in units of predetermined cycles.

The photoelectric conversion output of the CCD 23, which is an analog signal, is subjected to gain adjustment in units of primary color components of RGB, then sample-held by a sample hold circuit 26, and converted into digital data by an A/D converter 27. After that, a color process circuit 28 performs, on the digital data, color processing including pixel interpolation and $\gamma$ correction. As a result, the color process circuit 28 generates a digital brightness signal Y and color-difference signals Cb and Cr, and outputs them to a direct memory access (DMA) controller 29.

The DMA controller 29 once writes the digital brightness signal Y and color-difference signals Cb and Cr to a buffer incorporated therein, using a complex synchronous signal, memory write enable signal and clock signal from the color process circuit 28. The DMA controller 29 DMA-transfers the brightness signal Y and color-difference signals Cb and Cr via a DRAM interface (I/F) 30 to a DRAM 31 used as a buffer memory.

A controller 32 is formed of, for example, a microcomputer that includes a CPU, a ROM storing programs executed by the CPU, and a RAM used as a work memory. In this embodiment, the ROM stores a control program for driving the strobe emission section 6 as a flash device.

The controller 32 controls the entire digital camera 1. After DMA transfer of the brightness signal Y and color-difference signals Cb and Cr to the DRAM 31, the controller 32 reads these signals from the DRAM 31 via the DRAM interface 30, and writes them to a VRAM 34 via a VRAM controller 33.

A digital video encoder 35 periodically reads the brightness and color-difference signals from the VRAM 34 via the VRAM controller 33, generates a video signal based on the read data, and displays them on the display section 17.

As described above, the display section 17 functions as a monitor display (electronic finder) during photography, and performs display based on the video signal from the digital video encoder 35, thereby displaying in real time an image based on image data currently read from the VRAM controller 33.

When the display section 17 displays a current monitor image in real time, if the shutter key 9 is pushed at a time point at which the user would like to photograph, for example, a still picture, a trigger signal is generated.

In response to the trigger signal, the controller 32 interrupts the route from the CCD 23 to the DRAM 31 to assume a record-saving state, immediately after finishing the DMA transfer to the DRAM 31 of the brightness and color-difference signals corresponding to one frame and currently read from the CCD 23.

In the record-saving state, the controller 32 reads the brightness and color-difference signals of one frame from the DRAM 31 via the DRAM interface 30 in units of components Y, Cb and Cr and in units of basic blocks each formed of (8×8) pixels. Subsequently, the controller 32 writes the read data to a joint photograph coding experts group (JPEG) processing block existing in an image-processing section 37, and compresses the data in the image-processing section 37 utilizing adaptive discrete cosine transform (ADCT), Huffman coding as entropy coding, etc.

After that, the controller 32 reads the resultant code data from the image-processing section 37, and writes it to a recording memory 38 as a data file corresponding to one image. The memory 38 includes, as well as a built-in memory, a memory card detachably attached to the camera as a recording medium. When the compression of the brightness and color-difference signals of one frame, and the writing of the compressed data to the memory 38 are finished, the controller 32 again activates the route from the CCD 23 to the DRAM 31.

A USB interface (I/F) 39 and strobe driving section 40 are also connected to the controller 32.

The USB interface 39 controls communication when image data, for example, is transmitted between the digital camera 1 and another information terminal, such as a personal computer, connected thereto by a cable via a USB connector.

During photography, the strobe driving section 40 charges a large-capacitance capacitor for strobe light (not shown), and causes the strobe emission section 6 to flash in accordance with an emission control signal output from the controller 32 in synchronism with the timing generator (TG) 24.

A key input section 36 comprises the above-mentioned shutter key 9, power supply key 8, mode switch 10, menu key 12, cross key 13, set key 14, etc. A signal generated when any one of these keys is operated is directly sent to the controller 32.

Further, in the case of photographing a moving picture (instead of a still picture), when the shutter key 9 is pushed, a moving-picture processing block contained in the image process section 37 compresses photographed moving-picture data utilizing motion picture expert group (MPEG) or motion-JPEG, and stores the compressed data in the memory 38. When the shutter key 9 is again pushed, the above operations are stopped.

On the other hand, in the playback mode as another basic mode, the controller 32 selectively reads compressed image data from the memory 38, and expands the data using the image-processing section 37 by the procedure opposite to that employed to compress data in the record mode. After saving the expanded data in the DRAM 31 via the DRAM interface 30, the controller 32 stores the content of the DRAM 31 into the VRAM 34 via the VRAM controller 33, and periodically reads image data from the VRAM 34 to generate a video signal and play it back on the display section 17.

If the selected image data is not a still picture but a moving picture, MPEG image data providing the selected moving-picture file is replayed. After all moving-picture data items are replayed, the leading still picture data item, for example, is displayed until the playback mode is designated again.

The digital camera 1 is also provided with, for example, a battery used as a power supply when the camera is carried, a voltage supply controller for the battery, and a voice-processing section for processing voice data for the microphone 5 and speaker 11. These components are not shown.

For easy understanding of the process performed when the digital camera 1 uses strobe light, the general configuration and operation principle of the CCD 23 will be firstly described with reference to FIGS. 4 to 7.

Figure 4:
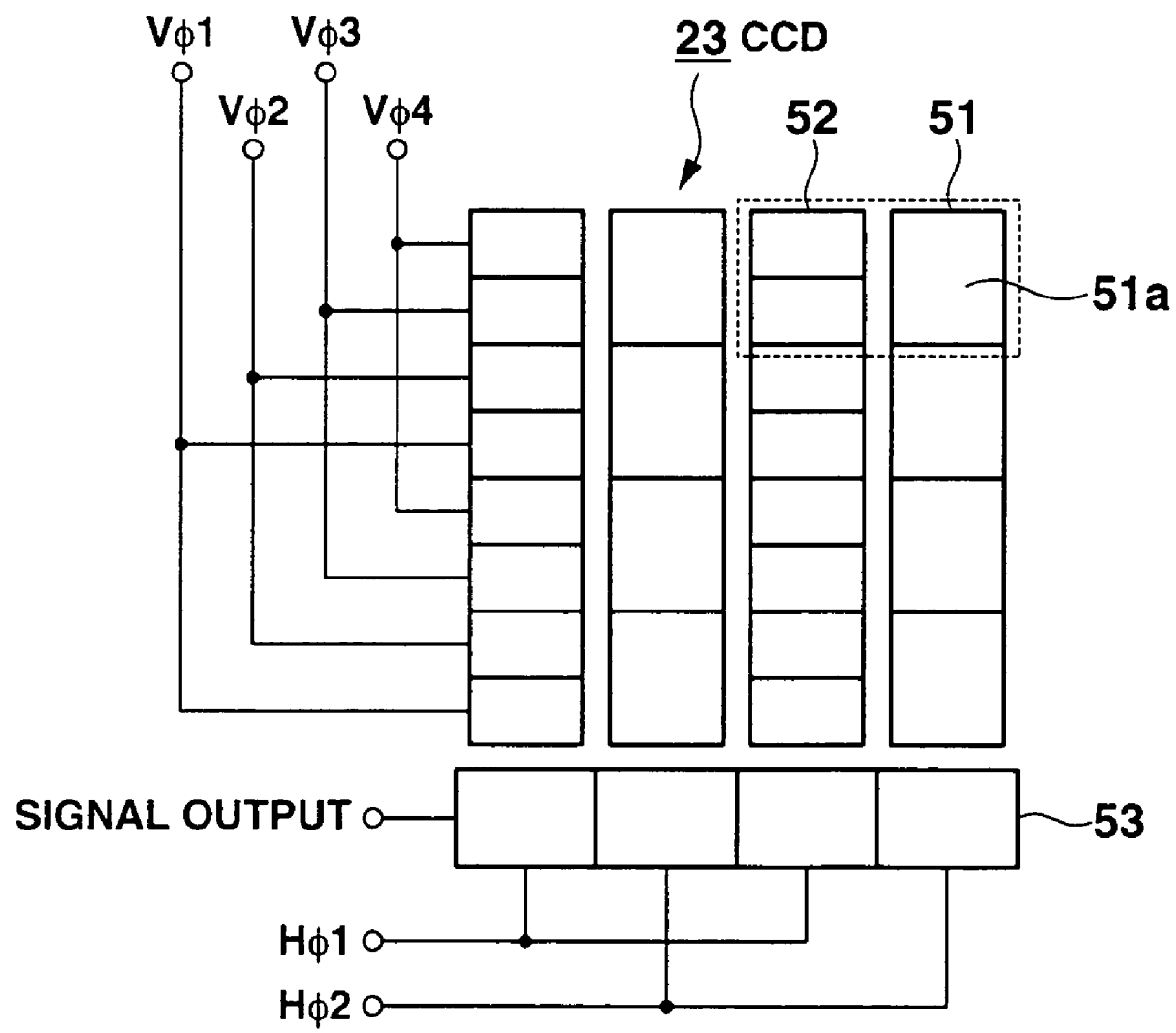
FIG. 4 is a view illustrating a CCD incorporated in the digital camera.
Figure 5:
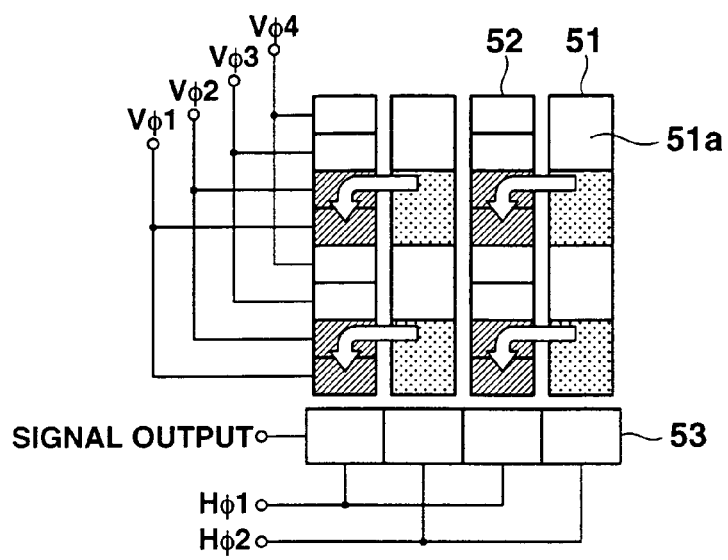
FIG. 5 is a view illustrating a first example of the flow of the charge of the CCD incorporated in the digital camera.
Figure 6:
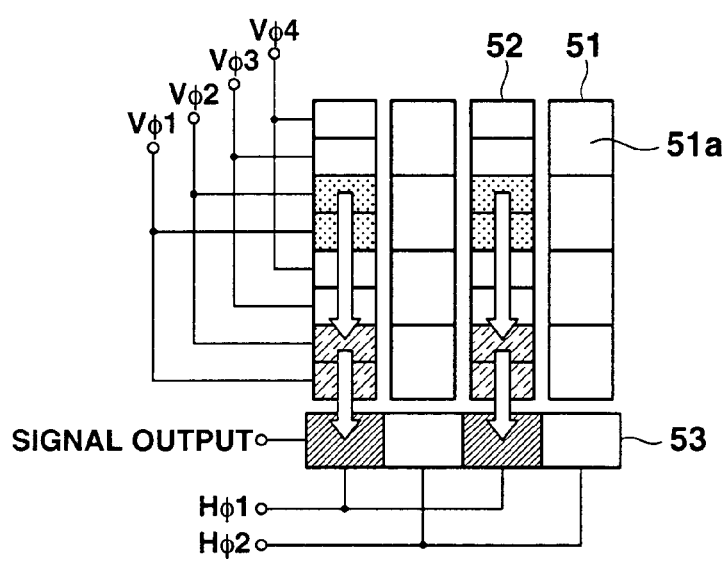
FIG. 6 is a view illustrating a second example of the flow of the charge of the CCD incorporated in the digital camera.
Figure 7:
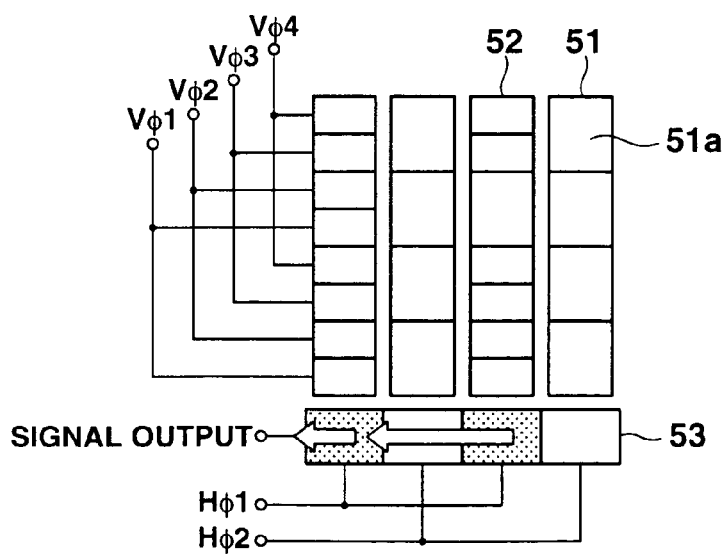
FIG. 7 is a view illustrating a third example of the flow of the charge of the CCD incorporated in the digital camera.

FIG. 4 shows the general configuration of the CCD 23. FIGS. 5 to 7 show the flow of the charge of the CCD 23. For facilitating the description, it is assumed that the CCD 23 has 4 rows of pixels and 2 columns of pixels. Actually, however, the photography area is formed of a much larger number of pixels.

As shown in FIG. 4, the CCD 23 comprises a photosensitive section 51, vertical transfer section 52 and horizontal transfer section 53. In FIG. 4, the components of the photosensitive section 51 and those of the vertical transfer section 52 are arranged alternately, and the portion indicated by the broken line corresponds to one pixel.

The photosensitive section 51 is formed of the same number of photodiodes 51a as that of the pixels, i.e., (2×4) photodiodes, which accumulate charges corresponding to their respective intensities of light received. The vertical transfer section 52 is called a "vertical transfer CCD", and configured to acquire the charge accumulated in each photodiode 51a of the photosensitive section 51, and to transfer it to the horizontal transfer section 53. The horizontal transfer section 53 is called a "horizontal transfer CCD", and configured to horizontally transfer the charges transferred from the vertical transfer section 52 to a destination.

The operation principle of the CCD 23 will be described, assuming that vertical transfer is performed by a 4-phase driving CCD for transferring charges using 4 electrodes, and that horizontal transfer is performed by a 2-phase driving CCD for transferring charges using 2 electrodes.

Firstly, an optical image formed by the photography lens 2 is irradiated onto the entire surface of the CCD 23, whereby the photodiodes 51a of the photosensitive section 51 accumulate charges corresponding to their respective intensities of light received. During the accumulation, the gate between the photosensitive section 51 and the vertical transfer section 52 is closed. As shown in FIG. 5, when a predetermined time elapses, charges corresponding to the odd lines of pixels and accumulated in the corresponding photodiodes 51a are shifted to the vertical transfer section (vertical transfer CCD) 52.

The charges are accumulated in only two of the four electrodes of the vertical transfer section 52. In this state, a 4-phase driving voltage is applied, and the charges corresponding to the odd lines of pixels and accumulated in the two electrodes are vertically (downwardly) transferred in parallel as shown in FIG. 6. When the charges reach the lowermost stage of the vertical transfer section 52, they are transferred to the horizontal transfer section 53 (horizontal transfer CCD).

As shown in FIG. 7, the charges corresponding to the odd lines of pixels and reaching the horizontal transfer section 53 are horizontally (leftward) transferred in synchronism with a 2-phase driving pulse signal. When all charges are transferred from the horizontal transfer section 53 to a detection section (not shown) described below, charges corresponding to the even lines of pixels are transferred to the section 53 by vertical transfer.

The destination of the output of the horizontal transfer section 53 is a detection section (not shown) for converting the charges into an electric signal. The horizontally transferred charges corresponding to the odd lines are sequentially sent to the detection section, where they are converted into an electric signal and output.

During the conversion process, charges corresponding to the even lines are shifted from the photodiodes 51a to the vertical transfer section 52, and output to the detection section via the vertical transfer section 52 and horizontal transfer section 53.

Thus, the charges accumulated in the pixels of the CCD 23 are output to the detection section in units of odd or even lines of pixels by vertical transfer and horizontal transfer, and are sequentially fetched therefrom as an electric signal.

The operation of the digital camera 1 performed when the strobe emission section 6 is driven will be described. As described before, when the luminous energy for actual photography is determined from the estimation based on pre-emission, it is necessary to perform, during each frame of the image pickup element, exposure of the image pickup element to pre-emission, and transfer and estimation of the image data acquired by it. This means that a lot of time is required before emission for actual photography.

This will be described referring to FIG. 15. FIG. 15 is a timing chart illustrating the pre-emission operation of the strobe light of the conventional digital camera. In the figure, Ta represents the period of each frame, i.e., about 30 msec. During this period, assume that the CCD 23 as the image pickup element is being driven, and the image data acquired during the period is displayed as a monitor image on the display section 17.

When the luminous energy during photography is determined, firstly, the first pre-emission and exposure of each pixel thereto are performed in the frame following the frame in which the operation of the shutter is detected. In FIG. 15, t1 represents the first pre-emission period, and is, for example, 10 μs.

In the next frame, data (i.e., charge) in each pixel acquired by exposure to the first pre-emission is transferred, and in the following frame, estimation of brightness is performed. The second pre-emission and processing related thereto are performed one frame after the first pre-emission. Thus, the first and second pre-emissions and processing related thereto are performed in a parallel manner. In FIG. 15, t2 represents the second pre-emission period, and is, for example, 20 μs.

After the estimation of brightness related to the double pre-emissions is performed, appropriate luminous energy is calculated based on the estimation results, and emission for actual photography is performed in the next frame using the calculated appropriate luminous energy. In FIG. 15, t3 represents the period of emission for actual photography, and is, for example, 10 to 1000 μs.

As described above, after the shutter operation is detected, a processing period of 4 frames is required to perform the process ranging from the first pre-emission and exposure of the CCD thereto, to the acquisition of the estimation result concerning the second pre-emission. Since this processing period corresponds to the operation period ranging from the shutter operation to the actual photography, it may cause a so-called shutter time lag, whereby an opportunity for photography a nice scene may well be wasted.

Figure 8:
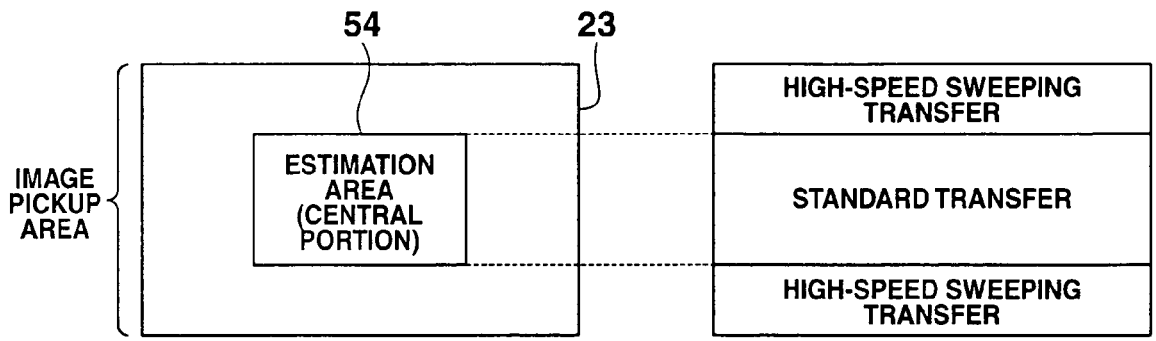
FIG. 8 is a view useful in explaining partial high-speed sweeping transfer performed in accordance with the estimation area of the CCD of the digital camera.

In light of the above, in the first embodiment of the invention, the way as illustrated in FIG. 8 is employed to shorten the time required for the above-described process using pre-emission. Specifically, attention has been paid to the fact that the area (hereinafter referred to as "the estimation area") 54 needed for estimation using pre-emission is only a part of the image pickup area of the CCD 23 as the image pickup element. Accordingly, only the charges of pixels corresponding to the estimation area 54 are read by "standard transfer" in each frame. The charges of the pixels other than the estimation area 54 are destroyed by "high-speed sweeping transfer", regarding them as pixel data unnecessary for estimation, whereby the required total process time is shortened.

The estimation area 54 is the central portion of the image pickup area, and preferably, is at least ¼ the entire area. This is because if the estimation area 54 is less than ¼, the focusing position may fall out of the area.

Further, "standard transfer" means that both the vertical and horizontal transfer sections of the CCD 23 are driven to read the charged of pixels and transfer them to the destination in units of odd or even lines of pixels. On the other hand, "high-speed sweeping transfer" means that only the vertical transfer section of the CCD 23 is driven to read the charge of each pixel, and the read charges are destroyed. In other words, only vertical transfer for reading charges is performed, and horizontal transfer for transferring the read charges to the destination is not performed, whereby the read charges are brushed out.

The high-speed sweeping transfer can reduce the time, required to process the charges, to a value about ⅛ the time required when standard transfer is performed, although the reduction ratio depends upon the number of pixels. In the example of FIG. 8, the center portion of the image pickup area 23 is set as the estimation area 54. High-speed sweeping transfer is performed concerning the upper ¼ area and the lower ¼ area of the image pickup area 23, which are located above and below the estimation area 54 as the standard transfer area.

Some digital cameras have a function for storing various photographed scenes as a database (called "best shots" or "program scenes"). In this case, different focal points are set for different scenes. Further, there are cameras that enable users to manually set a focal point.

Figure 9:
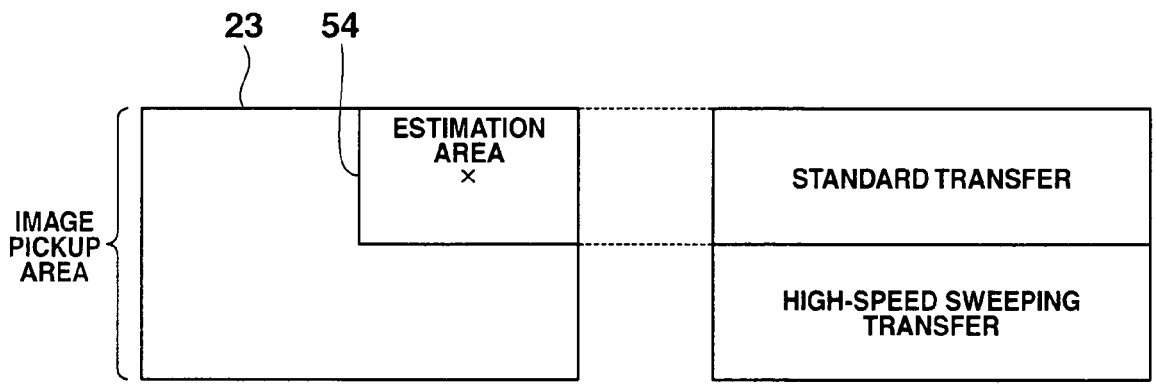
FIG. 9 is a view showing an example in which the estimation area of the CCD of the digital camera is set in accordance with the focusing position (in which the estimation area occupies the upper right portion of a picked-up image area)
Figure 10:
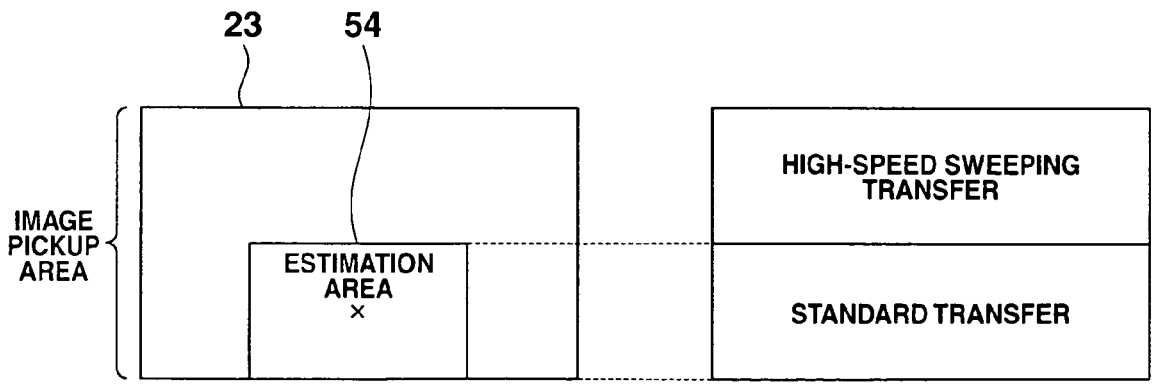
FIG. 10 is a view showing another example in which the estimation area of the CCD of the digital camera is set in accordance with the focusing position (in which the estimation area occupies the lower portion of a picked-up image area)

In light of the above cameras, as shown in FIGS. 9 and 10, the area included in the image pickup are of the CCD 23, in which high-speed sweeping transfer is performed, may be changed by setting the estimation area 54 in accordance with the focal point (indicated by X in the figures) that is adjusted whenever photography is performed.

FIG. 9 shows a case where the estimation area 54 is set in accordance with the focal point positioned in the upper right portion of the image pickup area. In this case, the upper half of the image pickup area is set as a standard transfer area, and the lower half is set as a high-speed sweeping transfer area. Further, FIG. 10 shows a case where the lower central area of the image pickup area is set as the estimation area 54. In this case, the upper half of the image pickup area is set as a high-speed sweeping transfer area, and the lower half is set as a standard transfer area.

Referring to the timing chart of FIG. 11 and the flowchart of FIG. 12, a description will be given of the pre-emission operation of the strobe emission section of the digital camera 1, assuming that the estimation area 54 is set as the central portion of the image pickup area (as shown in FIG. 8).

Figure 11:
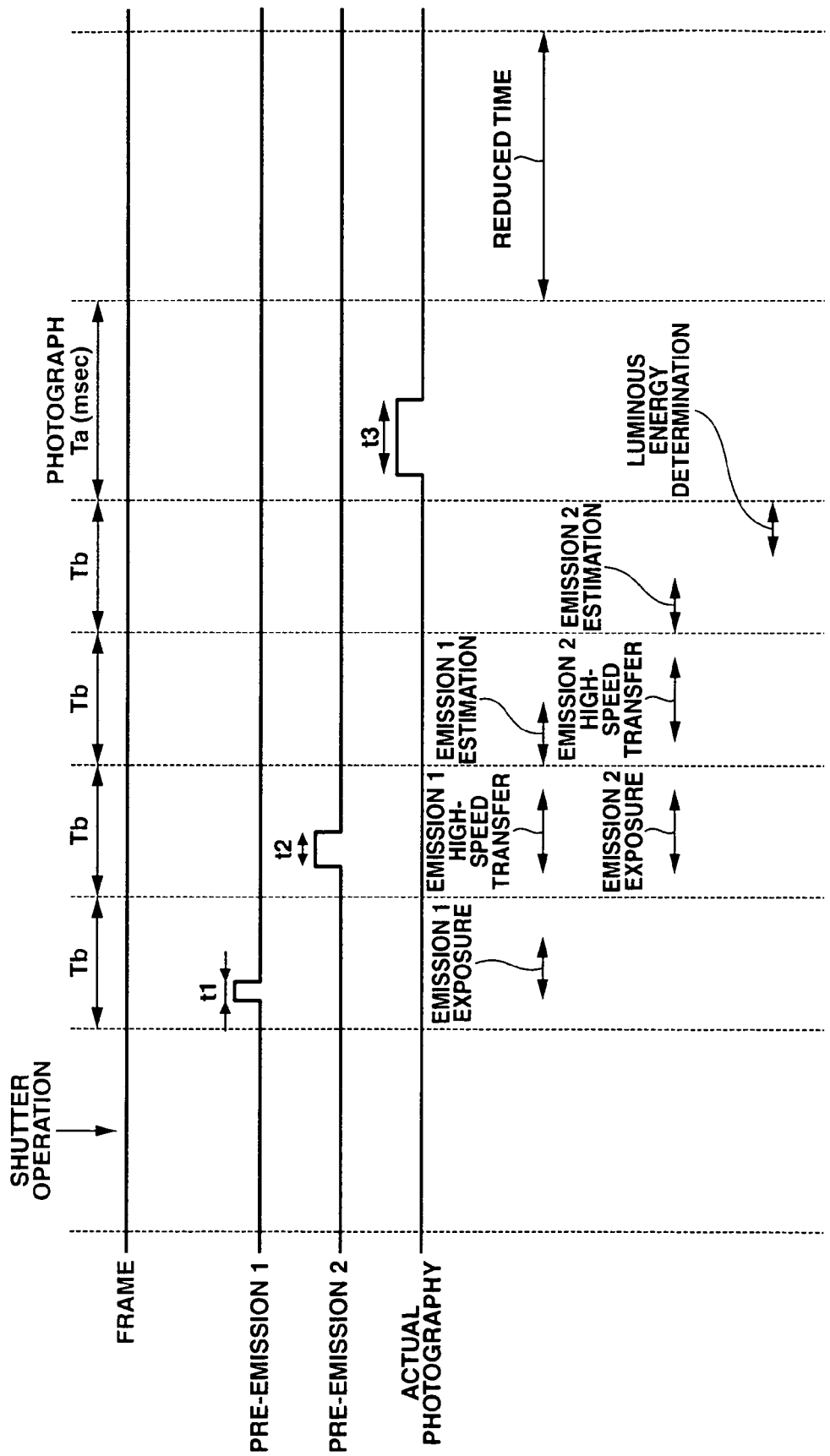
FIG. 11 is a timing chart useful in explaining the pre-emission operation of a strobe emission section incorporated in the digital camera.

FIG. 11 is a timing chart illustrating the pre-emission operation of the strobe emission section of the digital camera 1 according to the first embodiment. In FIG. 11, Ta and Tb represent frames, Ta being about 30 msec equal to the conventional frame shown in FIG. 15, Tb being about 15 msec that is half the conventional frame.

Figure 12:
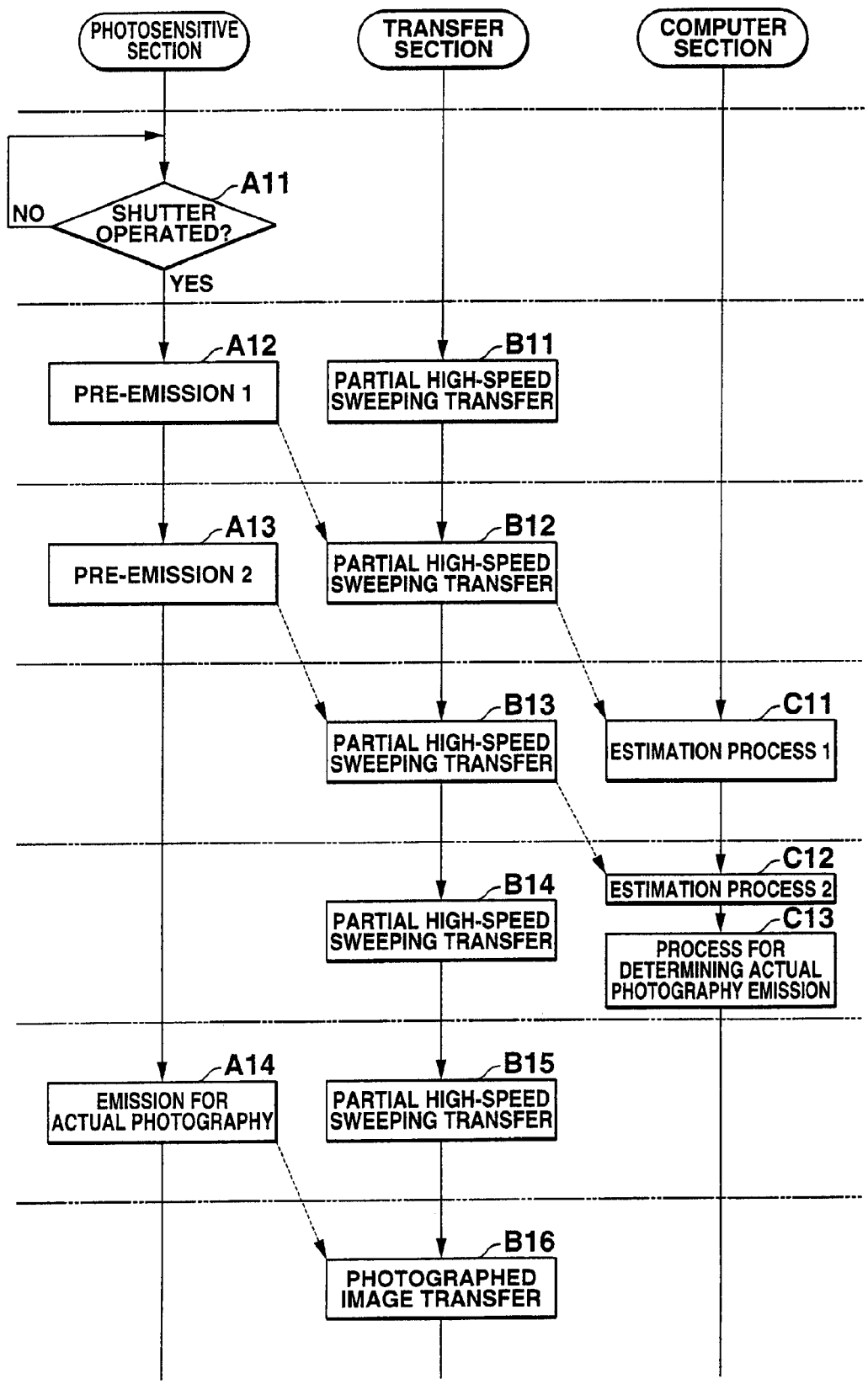
FIG. 12 is a flowchart illustrating the pre-emission operation of the strobe emission section.

FIG. 12 is a flowchart illustrating the pre-emission operation of the strobe emission section of the digital camera 1 according to the first embodiment. More specifically, FIG. 12 shows the processes performed by the controller 32 in relation to the photosensitive section 51 of the CCD 23, and in relation to the transfer sections 52 and 53, and also the computation process performed by the controller 32. The controller 32 as a microprocessor performs each process shown in the flowchart by reading the corresponding program from, for example, the ROM.

In a photography standby state in which a monitor image is displayed on the display section 17, if the shutter key 9 is half-pushed (Yes at step A11), the strobe emission section 6 is driven by the strobe driving section 40. As a result, the first pre-emission and exposure of each pixel of the CCD 23 to the pre-emission are performed for a preset period t1 (step A12).

Subsequently, in the next frame, the data (charge) of each pixel of the CCD 23 acquired by the exposure to the first pre-emission is transferred (step B12). In the following frame, estimation concerning the first pre-emission is performed (step C11).

On the other hand, one frame after the first pre-emission, the second pre-emission and exposure of each pixel of the CCD 23 to the second pre-emission are performed for a preset period t2 (step A13). In the next frame, the data (charge) of each pixel of the CCD 23 acquired by the exposure to the second pre-emission is transferred (step B13). In the following frame, estimation concerning the second pre-emission is performed (step C12).

When the estimation results of the first and second pre-emissions are acquired, appropriate luminous energy for the brightness of the subject is calculated based on the estimation results (step C13). In the following frame, when, for example, the shutter key 9 is completely pushed, the strobe emission section 6 emits light of the appropriate energy, which is emission for actual photography (step A14).

Concerning particulars of the process for calculating appropriate luminous energy for actual photography, using double pre-emissions, see Jpn. Pat. Appln. KOKAI Publication No. 2003-319255 filed by the same applicant as that of the present application.

The first embodiment is characterized by the way of driving the CCD 23 during each frame. Specifically, as described referring to FIG. 8, only the center portion of the image pickup area of the CCD 23 is required to determine the strobe luminous energy.

Accordingly, the center portion is set as the estimation area 54, and the vertical and horizontal transfer sections of the CCD 23 are driven so that the data (charges) of pixels corresponding to the estimation area 54 is read and transferred normally in units of odd or even lines of pixels. On the other hand, in the portion other than the estimation area 54, only the vertical transfer section of the CCD 23 is driven so that the data (charge) of each pixel is read and destroyed. The latter transfer method will now be called "high-speed sweeping transfer". In particular, when high-speed sweeping transfer is performed concerning only a part of the image pickup area of the CCD 23, this will be called "partial high-speed sweeping transfer".

As illustrated in the flowchart of FIG. 12, during each frame ranging from the shutter operation to emission for actual photography, the controller 32 causes different ways of transfer (vertical and horizontal transfer) to be performed in different portions of the CCD 23 in consideration of the position of the estimation area 54, thereby performing "partial high-speed sweeping transfer" (steps B11 to B14). Furthermore, also in the frame in which emission for actual photography is performed, "partial high-speed sweeping transfer" is performed concerning each pixel data item acquired in the preceding frame (step B15).

When "partial high-speed sweeping transfer" is performed, a partially broken monitor image is displayed on the display section 17. However, this state will sooner shift to a photography state, therefore it is considered that no problem will occur.

Thus, the data (charge) of each pixel acquired by "partial high-speed sweeping transfer" during the first and second pre-emission operations is sample-held by the sample-hold circuit 26, then converted into digital data by the A/D converter 27, and supplied to the controller 32.

Based on the data acquired by the double pre-emission operations, the controller 32 determines appropriate luminous energy for the brightness of the subject, and performs emission for actual photography with the appropriate luminous energy. The data (charge) of all pixels of the CCD 23 acquired from the emission for actual photography is normally read and output (step B16).

The read data is converted into digital data by the sample hold circuit 26 and A/D converter 27, and recorded as a photograph image in the memory 38 after a predetermined process. Processing performed during photography is already described with reference to FIG. 3, and therefore will not be described again.

Second Embodiment

A second embodiment of the invention will be described.

The outward appearance and circuit configuration of the digital camera 1 are the same as those of the first embodiment. Therefore, in this section, only different processing will be described with reference to FIGS. 13 and 14.

Figure 13:
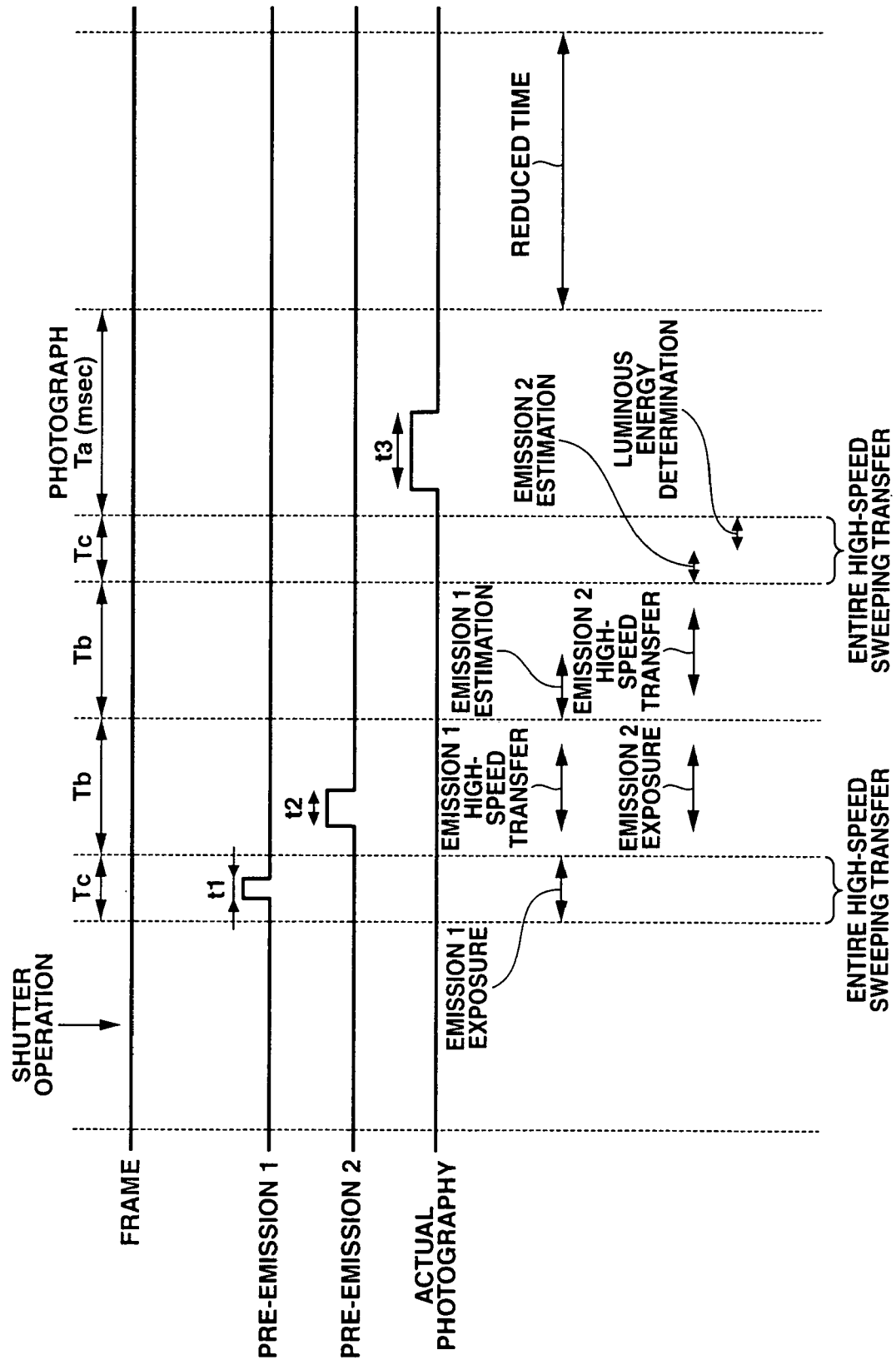
FIG. 13 is a timing chart useful in explaining the pre-emission operation of a strobe emission section incorporated in a digital camera according to a second embodiment of the invention.

FIG. 13 is a timing chart illustrating a pre-emission operation performed by the strobe emission section of the digital camera 1 according to the second embodiment. In the figure, Ta, Tb and Tc represent frames, Ta being about 30 msec equal to the conventional frame shown in FIG. 15, Tb being about 15 msec that is half the conventional frame. Further, Tc indicates that the time required for the first pre-emission is further reduced by virtue of "entire-area high-speed sweeping transfer", compared to the first embodiment.

Figure 14:
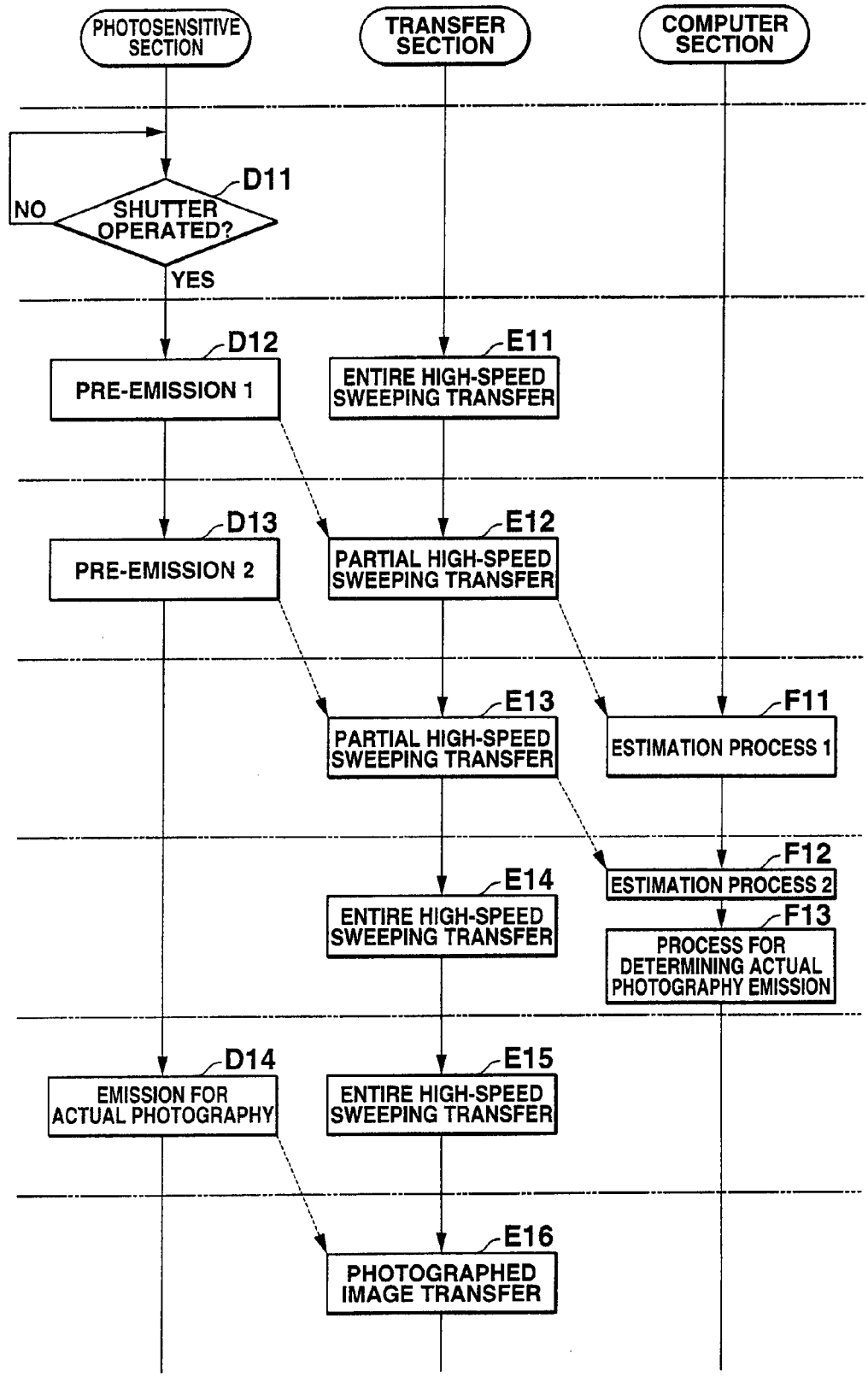
FIG. 14 is a flowchart illustrating the pre-emission operation of the strobe emission section of the digital camera according to the second embodiment.

FIG. 14 is a flowchart illustrating the pre-emission operation of the strobe emission section of the digital camera 1 according to the second embodiment. More specifically, FIG. 14 shows the processes performed by the controller 32 in relation to the photosensitive section 51 of the CCD 23, and in relation to the transfer sections 52 and 53, and also the computation process performed by the controller 32. The controller 32 as a microprocessor performs each process shown in the flowchart by reading the corresponding program from, for example, the ROM.

The basic flow of processing is similar to that of the first embodiment.

Specifically, in a standby state, before photography, in which a through or monitor image is displayed on the display section 17, when, for example, the shutter key 9 is half-pushed (Yes at step D11), the first pre-emission and exposure of each pixel of the CCD 23 to the first pre-emission are performed for a preset period t1 (step D12). Subsequently, in the next frame, the data (charge) of each pixel of the CCD 23 acquired by the exposure to the first pre-emission is transferred (step E12). In the following frame, estimation concerning the first pre-emission is performed (step F11).

On the other hand, one frame after the first pre-emission, the second pre-emission and exposure of each pixel of the CCD 23 to the second pre-emission are performed for a preset period t2 (step D13). In the next frame, the data (charge) of each pixel of the CCD 23 acquired by the exposure to the second pre-emission is transferred (step E13). In the following frame, estimation concerning the second pre-emission is performed (step F12).

When the estimation results of the first and second pre-emissions are acquired, appropriate luminous energy for the brightness of the subject is calculated based on the estimation results (step F13). In the following frame, when, for example, the shutter key 9 is completely pushed, the strobe emission section 6 emits light of the appropriate energy, which is emission for actual photography (step D14).

In the second embodiment, in those of the frames ranging from the shutter operation to the emission for actual photography, which are unnecessary for the estimation of the pre-emissions, only the vertical transfer section of the CCD 23 is driven so that the data (charges) of all pixels of the CCD 23 is destroyed. The method for driving only the vertical transfer section of the CCD 23 to destroy the data (charges) of all pixels will be referred to as "entire high-speed sweeping transfer".

As can be seen from FIG. 13, the frame immediately after the shutter operation, i.e., "the frame in which the first pre-emission and exposure to the first pre-emission are performed", is one of the frames unnecessary for the estimation of the pre-emissions. Further, the frame immediately before emission for actual photography, i.e., "the frame in which estimation of the second pre-emission and determination of luminous energy are performed", is the other of the unnecessary frames.

During these two unnecessary frames, the controller 32 drives only the vertical transfer section of the CCD 23, thereby achieving "entire high-speed sweeping transfer" (steps E11 and E15). During "entire high-speed sweeping transfer", no monitor image is displayed on the display section 17. However, this state continues for just a moment and will soon shift to a photography state. Therefore, it is considered that no problems will occur.

In contrast, during the frames other than the unnecessary frames, the controller 32 performs "partial high-speed sweeping transfer" as in the first embodiment (steps E12 to E14).

Specifically, in the portion of the image pickup area of the CCD 23 corresponding to the estimation area 54, both the vertical and horizontal transfer sections of the CCD 23 are driven so that the data (charges) of pixels is normally read and transferred from the CCD 23 in units of lines of pixels. In the portion of the CCD 23 other than the first-mentioned one, only the vertical transfer section of the CCD 23 is driven so that the data (charge) of each pixel is only read and destroyed. Also in the frame in which emission for actual photography is performed, "partial high-speed sweeping transfer" is performed concerning each pixel data item acquired in the preceding frame (step E15).

Thus, the data (charge) of each pixel of the image pickup area of the CCD 23, which is acquired from the first and second pre-emissions and corresponds to the estimation area 54, is sample-held by the sample hold circuit 26, converted into digital data by the A/D converter 27 and sent to the controller 32.

Based on the data acquired by the double pre-emission operations, the controller 32 determines appropriate luminous energy for the brightness of the subject, and performs actual photography with the appropriate luminous energy. The data (charge) of all pixels of the CCD 23 acquired from the emission for actual photography is normally read and output (step E16).

"Entire high-speed sweeping transfer" may be performed in at least one of the above-described unnecessary frames, i.e., either in the frame, in which the first pre-emission and exposure to the first pre-emission are performed, or in the frame, in which estimation of the second pre-emission and determination of luminous energy are performed.

A description will be given of the comparison between the processing time required in the conventional scheme and that required in scheme 1 of the present invention, between the former processing time and that required in scheme 2 of the present invention, and between the former processing time and that required in scheme 3 of the present invention. Scheme 1 is a case where "partial high-speed sweeping transfer" is performed in each frame. Scheme 2 is a case where "entire high-speed sweeping transfer" is performed either in the frame, in which the first pre-emission and exposure to the first pre-emission are performed, or in the frame, in which estimation of the second pre-emission and determination of luminous energy are performed. Scheme 3 is a case where "entire high-speed sweeping transfer" is performed both in the frame, in which the first pre-emission and exposure to the first pre-emission are performed, and in the frame, in which estimation of the second pre-emission and determination of luminous energy are performed.

Assume here that the processing time corresponding to 4 frames ranging from the shutter operation to emission for actual photography is a target. Assume further that the standard reading time of the CCD 23 is $1/30$ [s/frame], and the reading time during "high-speed sweeping transfer" is $1/8$ the standard reading time. Assume also that during "partial high-speed sweeping transfer", high-speed sweeping transfer is performed for the upper $1/4$ portion and lower $1/4$ portion of the image pickup area of the CCD 23, and standard transfer is performed for the middle $1/2$ portion of the image pickup area, as is shown in FIG. 8.

(a) Processing time required in the conventional scheme $4 \text{ (frames)} \times 1/30 \text{ [s/frame]} = 4/30 \text{ [s]}$ (b) Processing time required in scheme 1

$4 \text{ (frames)} \times 1/30 \text{ [s/frame]} \times \{(1/4 \times 1/8) +$ $(1/2 \times 1) + (1/4 \times 1/8)\} = 4/30 \text{ [s]} \times 9/16$ (c) Processing time required in scheme 2

$3 \text{ (frames)} \times 1/30 \text{ [s/frame]} \times \{(1/4 \times 1/8) +$ $(1/2 \times 1) + (1/4 \times 1/8)\} + 1 \text{ (frame)} \times 1/30 \text{ [s/frame]} \times 1/8 = 4/30 \text{ [s]} \times 29/64$ (d) Processing time required in scheme 3

$2 \text{ (frames)} \times 1/30 \text{ [s/frame]} \times \{(1/4 \times 1/8) +$ $(1/2 \times 1) + (1/4 \times 1/8)\} + 2 \text{ (frames)} \times 1/30 \text{ [s/frame]} \times 1/8 = 4/30 \text{ [s]} \times 11/32$ If the processing time required in the conventional scheme is 1, Conventional scheme: 1
Scheme 1: $9/16 = 0.56$
Scheme 2: $29/64 = 0.45$
Scheme 3: $11/32 = 0.34$ From the above, it can be understood that the processing time required in the present invention is significantly reduced compared to the conventional scheme.

The schemes of the invention are applicable not only to the case where the central portion of the image pickup area of the CCD 23 is used as the estimation area 54, but also to the case as shown in FIG. 9 or 10 where the estimation area is varied in accordance with the focal point set during photography. In the latter case, if partial high-speed sweeping transfer is performed in accordance with the position of the estimation area 54 in the image pickup area of the CCD 23, the required processing time is reduced compared to the conventional scheme. Further, if entire high-speed sweeping transfer is performed in frames unnecessary for estimation, the required processing time is further reduced.

Although in the embodiments, the estimation area 54 is set to $1/4$ of the entire image pickup area as shown in, for example, FIG. 8, it may be set to a lower value, such as $1/16$, if the focal point of a subject can be detected more accurately. In this case, the same advantage as the above can be acquired by performing high-speed sweeping transfer of data corresponding to unnecessary pixels that are not included in the detected estimation area 54.

Moreover, in each embodiment, the data of pixels needed for estimation corresponding to the estimation area 54 is read in units of lines of pixels. Alternatively, the CCD 23 may be driven by software so that pixel data will be selectively read from the CCD 23 in accordance with the configuration of the estimation area 54. In this case, the estimation area 54 is not limited to the rectangular shape shown in, for example, FIG. 8, but may be formed, for example, circular.

In addition, although in each embodiment, a CCD image sensor is used as the image pickup element, the image pickup element may be formed of another element such as a complementary metal oxide semiconductor (CMOS) image sensor.

The strobe emission member may be formed of, for example, a light emitting diode (LED).

The invention is not limited to digital cameras, but also applicable to a mobile phone or personal digital assistant (PDA) equipped with a camera. It is sufficient if the device is an electronic device capable of photography, in which exposure adjustment is performed during photography using, for instance, strobe emission. If the invention is applied to such devices, the same advantage as described above can be acquired.

The present invention is not limited to the above-described embodiments, but may be modified in various ways without departing from the scope. Further, various inventions can be achieved by appropriately combining the structural elements disclosed in the embodiments. For example, some may be deleted from the structural elements disclosed in the embodiments.

The method employed in each embodiment can be used, for various devices, in the form of a program executed in a computer and stored in a recording medium, such as a magnetic disk (flexible disk, hard disk, etc.), an optical disk (CD-ROM, DVD, etc.), a semiconductor memory. Further, the program can be directly transmitted from a communication medium, such as a network, to each device. A computer for realizing the present device invention reads the program from a recording medium or via a communication medium, and performs the above-described processing under the control of the program.

Furthermore, the invention can be carried out using various large-capacity recording mediums to be developed henceforth, as well as the above-mentioned recording mediums (CD-ROMs, DVD-ROMS, etc.). Such large-capacity recording mediums include next-generation optical disks using a blue laser beam, such as blue-ray disks (R), advanced optical disks (AODs), HD-DVDs using a red laser beam, blue laser DVDs using a blue/violet laser beam.

What is claimed is:

1. An imaging apparatus comprising:
   an emission section configured to emit light to a subject;
   an image pickup element configured to photograph the subject, an image of the subject being formed in an image pickup area comprising a plurality of pixels, the image pickup element photographing the subject by performing photoelectric conversion of the image of the subject to output image data;
   an image pickup controller configured to, in response to a shutter operation, cause the image pickup element to perform actual photography in which the whole image pickup area outputs the image data and the output image data is recorded in a recording medium;
   a first emission controller configured to cause the emission section to perform two pre-emissions of the light at different luminous energy levels during a period after the shutter operation and before the actual photography;
   an estimation area setting section configured to set an estimation area which is smaller than the whole image pickup area and which corresponds to a focal point adjusted each time photographing is carried out;
   a first image-pickup-element driving section configured to drive the image pickup element during the period after the shutter operation and before the actual photography to transfer image data output from the estimation area set by the estimation area setting section;
   a second image-pickup-element driving section configured to drive the image pickup element during the period after the shutter operation and before the actual photography to delete image data output from a non-estimation area, which is a part of the image pickup area other than the estimation area;
   a luminous energy determination section configured to determine an appropriate luminous energy for the actual photography by performing an estimation of respective image data output from the estimation area when the subject is photographed in each of the two pre-emissions; and
   a second emission controller configured to cause the emission section to perform emission for the actual photography at the appropriate luminous energy determined by the luminous energy determination section.

2. The imaging apparatus according to claim 1, wherein the second image-pickup-element driving section drives the image pickup element only in one data-acquiring-direction in the non-estimation area, thereby deleting the image data output from the non-estimation area.

3. An imaging apparatus comprising:
   an emission section configured to emit light to a subject;
   an image pickup element configured to photograph the subject, an image of the subject being formed in an image pickup area comprising a plurality of pixels, the image pickup element photographing the subject by performing photoelectric conversion of the image of the subject to output image data;
   an image pickup controller configured to, in response to a shutter operation, cause the image pickup element to perform actual photography in which the whole image pickup area outputs the image data and the output image data is recorded in a recording medium;
   a first emission controller configured to cause the emission section to perform two pre-emissions of the light at different luminous energy levels during a period after the shutter operation and before the actual photography;
   a first image-pickup-element driving section configured to drive the image pickup element during an estimation necessary period included in the period after the shutter operation and before the actual photography to transfer image data output from an estimation area, which is smaller than the whole image pickup area;
   a second image-pickup-element driving section configured to drive the image pickup element during the estimation necessary period included in the period after the shutter operation and before the actual photography to delete image data output from a non-estimation area, which is a part of the image pickup area other than the estimation area;
   a third image-pickup-element driving section configured to drive the image pickup element during an estimation unnecessary period included in the period after the shutter operation and before the actual photography to delete the image data output from the whole image pickup area;
   a luminous energy determination section configured to determine an appropriate luminous energy for the actual photography by performing an estimation of respective image data output from the estimation area when the subject is photographed in each of the two pre-emissions; and
   a second emission controller configured to cause the emission section to perform emission for the actual photography at the appropriate luminous energy determined by the luminous energy determination section;

wherein the estimation unnecessary period includes at least one of a period during which a first one of the two pre-emissions is performed and a period during which the luminous energy determination section performs the estimation of the image data output from the estimation area when the subject is photographed in a second one of the two pre-emissions; and wherein the estimation necessary period is a period included in the period after the shutter operation and before the actual photography except for the estimation unnecessary period.

4. The imaging apparatus according to claim 3, wherein the second image-pickup-element driving section drives the image pickup element only in one data-acquiring-direction in the non-estimation area, thereby deleting the image data output from the non-estimation area.

5. The imaging apparatus according to claim 3, further comprising an estimation area setting section configured to set the estimation area which is smaller than the whole image pickup area and which corresponds to a focal point adjusted each time photographing is carried out.

6. An imaging apparatus comprising:
emission means for emitting light to a subject;
image pickup means for photographing the subject, an image of the subject being formed in an image pickup area comprising a plurality of pixels, the image pickup means photographing the subject by performing photoelectric conversion of the image of the subject to output image data;
image pickup control means for, in response to a shutter operation, causing the image pickup means to perform actual photography in which the whole image pickup area outputs the image data and the output image data is recorded in a recording medium;
first emission control means for causing the emission means to perform two pre-emissions of the light at different luminous energy levels during a period after the shutter operation and before the actual photography;
estimation area setting means for setting an estimation area which is smaller than the whole image pickup area and which corresponds to a focal point adjusted each time photographing is carried out;
first image-pickup driving means for driving the image pickup means during the period after the shutter operation and before the actual photography to transfer image data output from the estimation area set by the estimation area setting means;
second image-pickup driving means for driving the image pickup means during the period after the shutter operation and before the actual photography to delete image data output from a non-estimation area, which is a part of the image pickup area other than the estimation area;
luminous energy determination means for determining an appropriate luminous energy for the actual photography by performing an estimation of respective image data output from the estimation area when the subject is photographed in each of the two pre-emissions; and
second emission control means for causing the emission means to perform emission for the actual photography at the appropriate luminous energy determined by the luminous energy determination means.

7. An imaging apparatus comprising:
emission means for emitting light to a subject;
image pickup means for photographing the subject, an image of the subject being formed in an image pickup area comprising a plurality of pixels, the image pickup means photographing the subject by performing photoelectric conversion of the image of the subject to output image data;
image pickup control means for, in response to a shutter operation, causing the image pickup means to perform actual photography in which the whole image pickup area outputs the image data and the output image data is recorded in a recording medium;
first emission control means for causing the emission means to perform two pre-emissions of the light at different luminous energy levels during a period after the shutter operation and before the actual photography;
first image-pickup driving means for driving the image pickup means during an estimation necessary period included in the period after the shutter operation and before the actual photography to transfer image data output from an estimation area, which is smaller than the whole image pickup area;
second image-pickup driving means for driving the image pickup means during the estimation necessary period included in the period after the shutter operation and before the actual photography to delete image data output from a non-estimation area, which is a part of the image pickup area other than the estimation area;
third image-pickup driving means for driving the image pickup means during an estimation unnecessary period included in the period after the shutter operation and before the actual photography to delete the image data output from the whole image pickup area;
luminous energy determination means for determining an appropriate luminous energy for the actual photography by performing an estimation of respective image data output from the estimation area when the subject is photographed in each of the two pre-emissions; and
second emission control means for causing the emission means to perform emission for the actual photography at the appropriate luminous energy determined by the luminous energy determination means;
wherein the estimation unnecessary period includes at least one of a period during which a first one of the two pre-emissions is performed and a period during which the luminous energy determination means performs the estimation of the image data output from the estimation area when the subject is photographed in a second one of the two pre-emissions; and
wherein the estimation necessary period is a period included in the period after the shutter operation and before the actual photography except for the estimation unnecessary period.

8. A method for an imaging apparatus that includes an emission section for emitting light to a subject and an image pickup element for photographing the subject, an image of the subject being formed in an image pickup area comprising a plurality of pixels, and the image pickup element photographing the subject by performing photoelectric conversion of the image of the subject to output image data, the method comprising:
performing, in response to a shutter operation, actual photography in which the whole image pickup area outputs the image data and the output image data is recorded in a recording medium;
causing the emission section to perform two pre-emissions of the light at different luminous energy levels during a period after the shutter operation and before the actual photography;

setting an estimation area which is smaller than the whole image pickup area and which corresponds to a focal point adjusted each time photographing is carried out;

driving the image pickup element during the period after the shutter operation and before the actual photography to transfer image data output from the estimation area;

driving the image pickup element during the period after the shutter operation and before the actual photography to delete image data output from a non-estimation area, which is a part of the image pickup area other than the estimation area;

determining an appropriate luminous energy for the actual photography by performing an estimation of respective image data output from the estimation area when the subject is photographed in each of the two pre-emissions; and causing the emission section to perform emission for the actual photography at the appropriate luminous energy.

9. A method for an imaging apparatus that includes an emission section for emitting light to a subject and an image pickup element for photographing the subject, an image of the subject being formed in an image pickup area comprising a plurality of pixels, and the image pickup element photographing the subject by performing photoelectric conversion of the image of the subject to output image data, the method comprising:

performing, in response to a shutter operation, actual photography in which the whole image pickup area outputs the image data and the output image data is recorded in a recording medium;

causing the emission section to perform two pre-emissions of the light at different luminous energy levels during a period after the shutter operation and before the actual photography;

driving the image pickup element during an estimation necessary period included in the period after the shutter operation and before the actual photography to transfer image data output from an estimation area, which is smaller than the whole image pickup area;

driving the image pickup element during the estimation necessary period included in the period after the shutter operation and before the actual photography to delete image data output from a non-estimation area, which is a part of the image pickup area other than the estimation area;

driving the image pickup element during an estimation unnecessary period included in the period after the shutter operation and before the actual photography to delete the image data output from the whole image pickup area;

determining an appropriate luminous energy for the actual photography by performing an estimation of respective image data output from the estimation area when the subject is photographed in each of the two pre-emissions; and causing the emission section to perform emission for the actual photography at the appropriate luminous energy;

wherein the estimation unnecessary period includes at least one of a period during which a first one of the two pre-emissions is performed and a period during which the estimation of the image data output from the estimation area when the subject is photographed in a second one of the two pre-emissions is performed; and wherein the estimation necessary period is a period included in the period after the shutter operation and before the actual photography except for the estimation unnecessary period.

* * * * *